United States Patent [19]

Heller

[11] Patent Number: 5,332,594
[45] Date of Patent: Jul. 26, 1994

[54] BRAN BASED SNACK PRODUCT AND PROCESS OF MAKING

[76] Inventor: Harry E. Heller, 26 Ivy Way, Port Washington, N.Y. 11050

[21] Appl. No.: 415,666

[22] Filed: Oct. 2, 1989

[51] Int. Cl.$^5$ ............................ A23L 1/10; A23P 1/12
[52] U.S. Cl. ..................................... 426/549; 426/439
[58] Field of Search ..................... 426/549, 439, 808

[56] References Cited

U.S. PATENT DOCUMENTS 4,517,204  5/1985  Mottur et al. ................... 426/804
4,803,091  2/1989  Mottur et al. ................... 426/439

FOREIGN PATENT DOCUMENTS 0117044  8/1984  European Pat. Off. .

*Primary Examiner*—Donald E. Czaja
*Assistant Examiner*—Mary S. Mims
*Attorney, Agent, or Firm*—Hoffman, Wasson & Gitler

[57] ABSTRACT

A method for producing a water-based bran, such as oat bran, snack product or chip wherein a doughlike mixture of oat bran, masa, gluten flour and water is mixed, and fried to produce a stable dry chip or snack product. The unique process forms a stable chip which delivers large doses of oat bran to the consumer. The product, when sold in 3½ oz. portions delivers 1 oz. of oat bran exceeding the minimum recommended daily requirement for oat bran.

8 Claims, No Drawings

BRAN BASED SNACK PRODUCT AND PROCESS OF MAKING

BACKGROUND OF THE INVENTION

This invention relates to a process for making fried snack products from mixtures of cereal products such as corn meal, water-soluble bran (oat, rice, etc.) and wheat or gluten flour, and the like as well as the unique dry snack product itself. One practice of the invention is particularly suitable for making extruded snack products containing a large amount of oat bran. The oat bran chip has a crunchy potato chip like texture, it exhibits a high degree of crispness, and lightness with a low amount of grittiness.

DESCRIPTION OF THE PRIOR ART

Traditional snack products are made from cereal grains such as corn, wheat, oats, barley, rice and the like. Utilized as the key constituents have been mixtures of precooked or raw flours of these cereal grains.

Several patents disclose corn chips made from a combination of corn and potatoes. See for example, U.S. Pat. No. 3,539,356 issued to Benson et al which describes a process for making snack chips from corn and potatoes in which the starting materials include at least 30% to 70% potatoes. The process comprises mixing the corn and potatoes into a dough, working and shaping the dough into a relatively thin piece having a sheer strength of at least 75 pounds, cutting the dough into chips, and deep frying the chips in oil.

U.S. Pat. No. 4,645,679 issued to Lee, III et al discloses a process for making corn chips with potato chip texture, wherein 80-95% hydrated corn, is mixed with 5-20% starch material to produce dough having a moisture content of about 30% to about 55%. The dough is then extruded, cut and deep fried into segments.

Dried masa flour (corn meal) is also available for the manufacture of corn snacks and other Mexican food specialties, such as tortilla and taco shells.

Typical processes for making dried masa flour based Mexican snack products is described in U.S. Pat. Nos. 4,344,366 to Garza; 2,704,257 to Diez De Sollano et al; and 3,369,908 to Gonzales et al. There lime-treated corn is ground and dehydrated to a stable form. The dried masa is later rehydrated to form a dough for extrusion or sheeting.

U.S. Pat. Nos. 4,623,548, 4,623,550, 4,769,253 and 4,770,891 issued to Willard all relate to a fried cereal-based snack prepared from a dough consisting of a low water absorbing component, a high water absorbing component, land a starch component. The mixture of the above dry solids and water from a dough which is extruded and fried to form expanded snack products.

It is desirable to produce fried snack products from mixtures of cereal ingredients not normally selected or chosen as a snack food which are not brittle, have acceptable fat content and deliver more than the required daily dosage of oat bran suggested by nutritionists per day in one serving.

The prior art has not suggested how to produce an oat bran based fried snack product which exhibits the structural shape and crisp texture of potato/corn chips or the like.

It is an object of the present invention to produce an oat bran based chip which has as an integral portion, component or ingredient mixed therein oat bran in combination with masa and gluten flour. The chip is less gritty, crunchy and easily melts in the mouth.

SUMMARY OF THE INVENTION

The invention provides a unique crunchy corn based chip-type snack product containing a significant amount of water soluble bran such as oat bran, as well as a process for producing the unique chip. The process comprises combining a quantity of masa, oat bran and gluten flour in an industrial mixer or the like. Mixing the combination until its evenly distributed. Adding water, to the mixture, at a preferred temperature for a set period of time. The mixture, when appropriate, is then sheeted out or extruded to form the desired shape.

The shaped products are then cut as desired and placed into a batch or continuous fryer, filled with peanut oil heated to a set temperature. Other oils, such as cottonseed, corn, safflower and the like are also contemplated.

The products are fried for a set time period and the food products are then lifted out of the vat and allowed to drain or are centrifically spun and cooled prior to packaging.

Produced is a structural stable oat bran food product comprising from about 60% to about 80%, by dry weight masa; from about 20% to about 40% oat bran, and, if desired, from about 5% to about 6% gluten flour.

No seasonings except for salt are added.

The method is particularly useful in making an oat bran based snack product.

These and other aspects of the invention will be more fully understood by referring to the following detailed description.

DETAILED DESCRIPTION OF THE INVENTION

This invention provides a novel water soluble bran based snack product such as oat bran and a process for making the product. The unique product contains masa or corn meal, oat bran, and if desired, gluten flour. No seasonings are added except for salt, if desired.

The dry components are mixed with water to form a dough, and the dough is sheeted out or extruded and formed to a desired shape.

In an industrial mixer fitted with a dough hook or in a hopper for on-line production masa (corn meal), oat bran and gluten flour are combined. The dry ingredients are mixed thoroughly. To the dry ingredients there is slowly added water at a temperature range of 100° F. to 115° F. The hydrated mixture contains 30% to 40% masa, preferably 34% by weight; 15% to 20% oat bran, preferably 17% by weight; 5% to 6% gluten flour, preferably 5% by weight; and approximately 25% to 50% water, preferably 43% by weight.

The combination is mixed until the mixture adheres to itself and appears doughlike.

The doughlike mixture is then sheeted out or extruded and formed to the desired shape.

The shaped snack products are then cut as desired and placed in a batch or continuous fryer, filled with a cholesterol free oil, preferably peanut oil, and heated to between 355° F. and 365° F.

The shaped products are cooked for approximately two and one-half minutes in batch equipment. Time adjustments are made based on the mode of cooking and the nature of the equipment used.

Snack products such as chips are lifted out of the vat and allowed to drain and cool prior to packaging. Alternatively, the chips can be spun in a centrifugal devide to remove excess oil. At this point, if desired, a quantity of salt can be added.

The unique product contains large amounts of oat bran and it is conceivable that a rice bran product can be manufactured and produced in a like manner.

EXAMPLE

One hundred pounds of masa is added to fifty pounds of oat bran. To this batch there is added thirteen and one-half pounds of gluten flour. Once mixed, one hundred twenty-five pounds of water is added to the mixture in a slow and continuous fashion. The water is heated to a temperature of 110° F. to 115° F.

Once the mixture adheres to itself and appears doughlike, the mixing is halted. The doughlike mixture is extruded and cut to a desired shape. Once cut, the chip units are placed in a batch fryer containing peanut oil heated to between 355° F. and 365° F. The chips are left in the batch fryer for approximately two and one-half minutes.

Chips are then lifted out of the vat and allowed to drain. The batch produces one hundred pounds of oat bran chips. The chips are placed in serving bags each totalling the suggested daily dosage of oat bran for the consumer per day.

Produced by the novel process is an oat bran based chip which delivers a significant dosage of oat bran in each chip.

What is claimed is:

1. A process for making oat bran based snack products comprising the steps of preparing a doughlike mixture comprising:
   a) 30% to about 40%, by weight of the doughlike mixture, masa;
   b) 15% to about 20%, by weight of the doughlike mixture, oat bran; and
   c) 40% to about 55%, by weight of the doughlike mixture, water, heated to a temperature range of 100° F. to 115° F.;
   extruding and cutting desired shapes from said doughlike mixture; and
   frying the desired shapes in hot cooking oil having a temperature of from about 355° F. to about 365° F. for a period of two to three minutes, wherein snack products in desired shapes are obtained.

2. A process for making oat bran based snack products as claimed in claim 1, wherein said doughlike mixture further comprises 5% to 6% by weight of the doughlike mixture, gluten flour.

3. A process for making oat bran based snack products as claimed in claim 1, wherein said hot cooking oil is peanut oil, soybean oil, cottonseed oil, safflower oil or corn oil.

4. A process for making oat bran based snack products comprising the steps of preparing a doughlike mixture comprising:
   a) 34%, by weight of the doughlike mixture, masa;
   b) 17%, by weight of the doughlike mixture, oat bran;
   c) 43%, by weight of the doughlike mixture, water, heated to a temperature range of 100° F. to 115° F.; and
   d) 6% by weight of the doughlike mixture, gluten flour
   extruding and cutting desired shapes from said doughlike mixture; and
   frying the desired shapes in hot cooking oil having a temperature of from about 355° F. to about 365° F. for a period of two to three minutes, wherein snack products in desired shapes are obtained.

5. A process for making oat bran based snack products as claimed in claim 4, wherein said hot cooking oil is peanut oil, soybean oil, cottonseed oil, safflower oil or corn oil.

6. An edible, pre-cooked, ready to eat dry snack product formed from a doughlike mixture comprising:
   a) 30% to about 40%, by weight of the mixture, masa;
   b) 15% to about 20%, by weight of the mixture, oat bran; and
   c) 40% to about 50%, by weight of the mixture, water.

7. An edible, pre-cooked, ready to eat dry snack product, as claimed in claim 6, further comprising 5% to about 6%, by weight of the mixture, gluten flour.

8. An edible, pre-cooked, ready to eat dry snack product formed from a doughlike mixture comprising:
   a) 34% to about 40%, by weight of the mixture, masa;
   b) 17% to about 20%, by weight of the mixture, oat bran;
   c) 43% to about 50%, by weight of the mixture, water; and
   d) 6%, by weight of the doughlike mixture, gluten flour.

* * * * *